(No Model.) 2 Sheets—Sheet 1.
L. G. H. KINSMAN.
BICYCLE.
No. 585,107. Patented June 22, 1897.
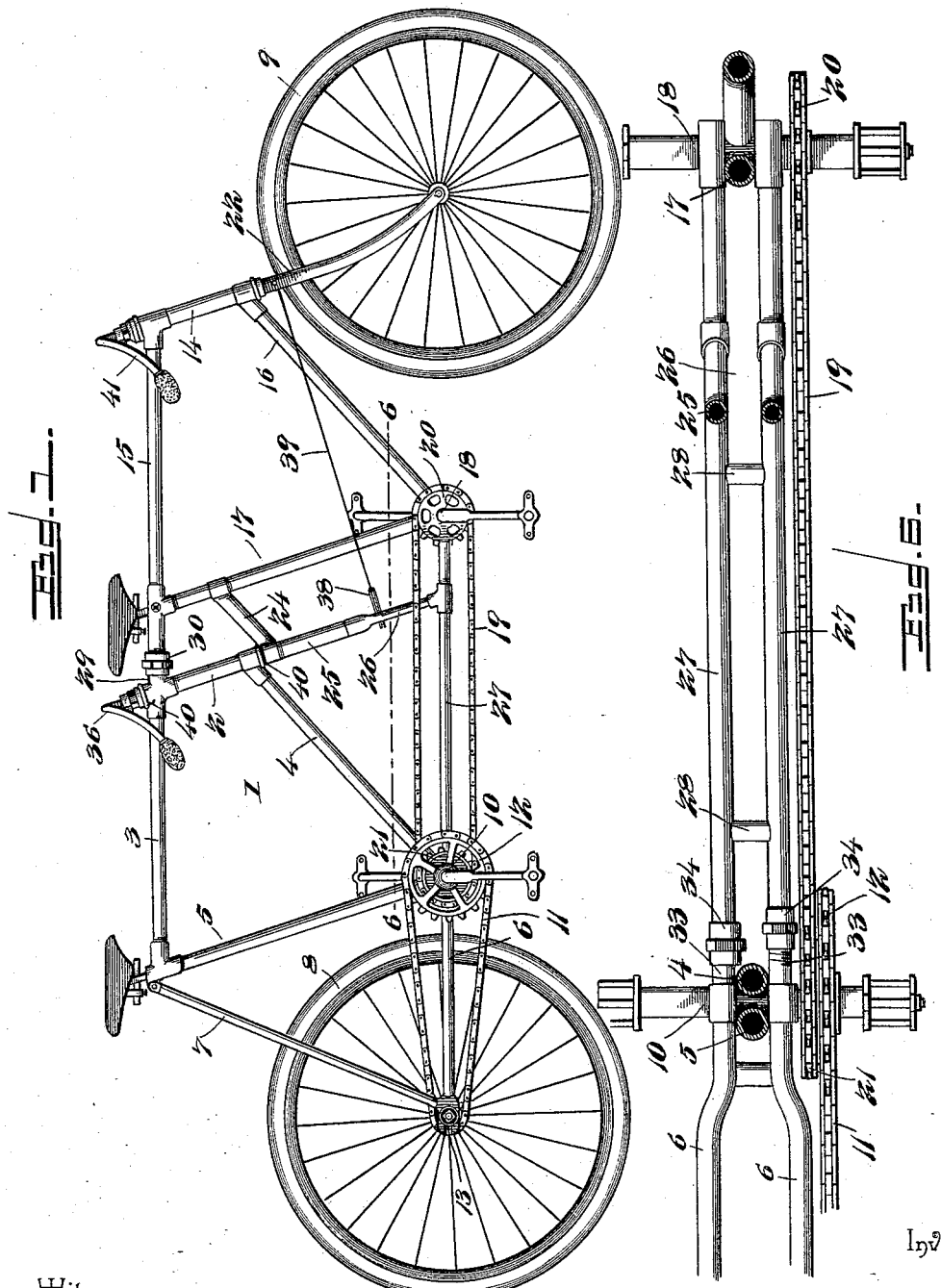
Witnesses
E. N. Stewart
R. M. Smith
Inventor
Louis G. H. Kinsman
By his Attorneys,
C. A. Snow & Co.

(No Model.) 2 Sheets—Sheet 2.
L. G. H. KINSMAN.
BICYCLE.
No. 585,107. Patented June 22, 1897.
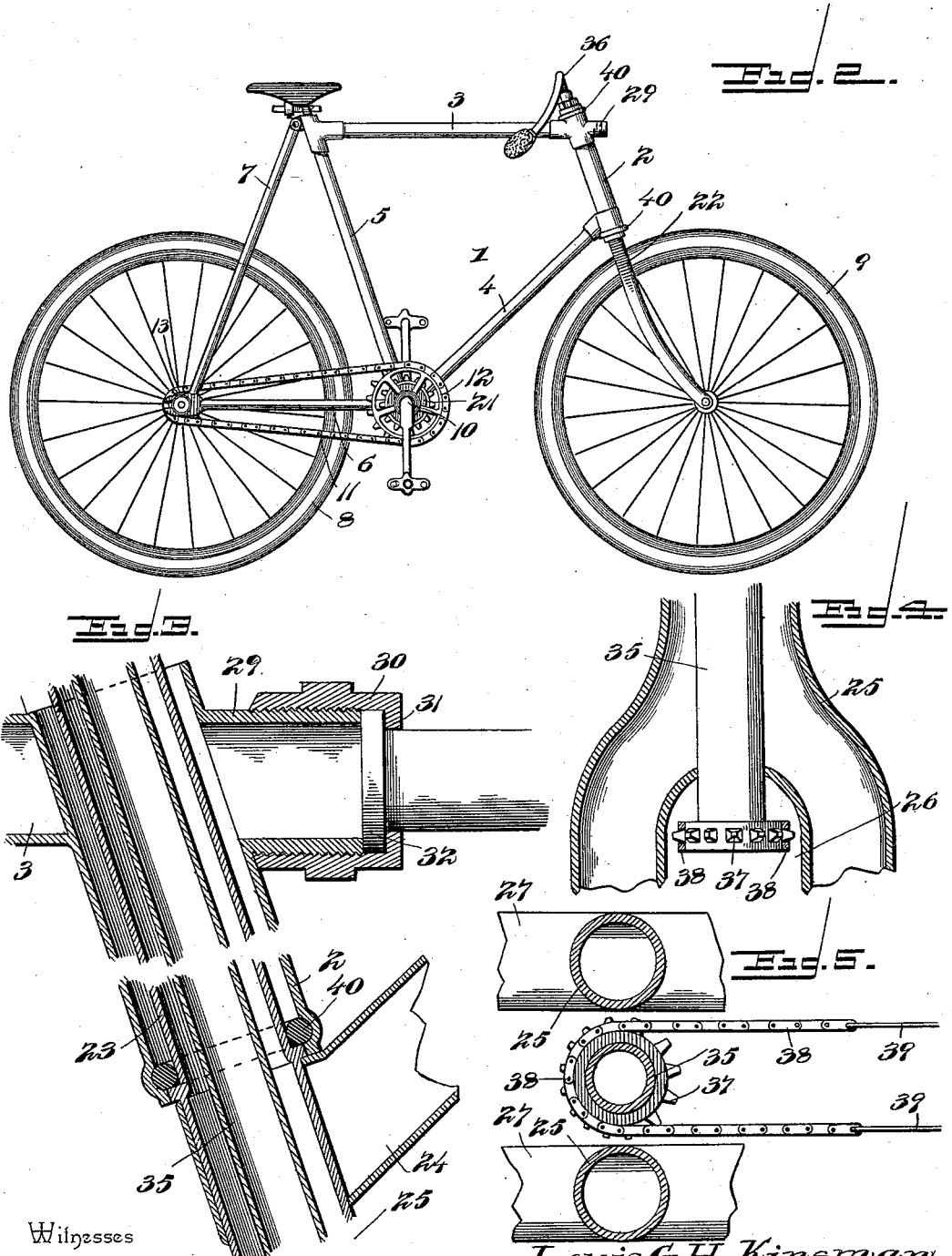
Witnesses
E. N. Stewart
R. M. Smith
Louis G. H. Kinsman
By his Attorneys,
C. A. Snow & Co.

UNITED STATES PATENT OFFICE.

LOUIS G. H. KINSMAN, OF SPRINGFIELD, MASSACHUSETTS.

BICYCLE.

SPECIFICATION forming part of Letters Patent No. 585,107, dated June 22, 1897.

Application filed May 22, 1896. Serial No. 592,598. (No model.)

*To all whom it may concern:*

Be it known that I, LOUIS G. H. KINSMAN, a citizen of the United States, residing at Springfield, in the county of Hampden and State of Massachusetts, have invented a new and useful Bicycle, of which the following is a specification.

This invention relates to bicycles; and the object in view is to provide a machine which is readily convertible from an ordinary single machine into a tandem, or vice versa. The machine, while quickly and easily convertible, as above mentioned, embodies a strong and thoroughly-braced frame, both of the riders have the steering-wheel immediately under control, and a thoroughly reliable and practical tandem bicycle is obtained.

The invention consists in a convertible single and tandem bicycle embodying certain novel features and details of construction and arrangement of parts, as hereinafter fully described, illustrated in the drawings, and incorporated in the claims hereto appended.

In the accompanying drawings, Figure 1 is a side elevation of a bicycle constructed in accordance with the present invention and shown in the form of a tandem. Fig. 2 is a similar view showing the machine converted into an ordinary single bicycle. Fig. 3 is an enlarged longitudinal section through the head of the single machine, showing the manner of coupling the tandem attachment thereto. Fig. 4 is a transverse vertical section taken through the forked lower end of one of the braces of the attachment, showing the manner of mounting the rear steering-stem. Fig. 5 is a detail horizontal section through the same, looking downward. Fig. 6 is a horizontal longitudinal section on the line 6 6 of Fig. 1.

Similar numerals of reference designate corresponding parts in the several figures of the drawings.

Referring to the accompanying drawings, 1 designates an ordinary safety-bicycle frame, comprising the usual head-tube 2, the upper horizontal bar 3, the reach-bar 4, the seat-post tube 5, the rear fork 6, and the rear braces 7.

8 represents the driving-wheel, 9 the steering-wheel, and 10 the crank-axle, from which motion is communicated to the driving-wheel 8 by means of the drive-chain 11, running around the driving-sprocket 12, which in the tandem forms the intermediate sprocket, and also around the rear sprocket 13 on the drive-wheel.

The attachment by which the single machine is converted into a tandem comprises a head-tube 14, an upper horizontal bar 15, a reach-bar 16, and a seat-post tube 17, the said parts which form the main portion of the frame of the attachment being the counterparts of the corresponding portions of the frame of the single machine above described, and the bar 15 forming an extension or continuation of the bar 3.

The frame of the attachment is provided with the usual crank-hanger at the junction of the reach-bar, seat-post tube, and rear forks, and in such hanger is mounted the auxiliary crank-axle 18 of the attachment, from which a drive-chain 19, after running over a sprocket 20 on the axle 18, extends rearwardly and runs over a sprocket-wheel or rim 21 on the intermediate sprocket 12 or the crank-axle 10. Power is thus transmitted from the front sprocket to the intermediate sprocket, and from thence the power of both riders is communicated to the rear sprocket on the driving-wheel.

The stem of the front fork 22 of the steering-wheel 9 is journaled in the head-tube 14 of the attachment, and the attachment is also provided with a tubular stem 23, arranged in rear of the seat-post tube 17 and parallel therewith, the said stem being adapted to be passed up through the head-tube 2 of the frame 1, thus forming one of the connections between the original frame and the frame of the attachment. The stem 23 is connected rigidly to the seat-post tube 17 by means of a tie-brace 24, connecting with the stem 23 just beneath the head-tube 2, and said stem is extended downward to form a tubular brace 25, the same being forked at its lower end, as shown at 26, the arms of said fork being united to parallel tubular bars 27, which are united permanently at their front ends to the front crank-hanger on the attachment, the said bars 27 being connected at suitable points by cross ties or braces 28.

The head-lug of the head-tube 2 is provided with a forwardly-extending tubular boss or thimble 29, which is externally threaded and adapted to be engaged by an internally-threaded sleeve or coupling 30, mounted on the rear end of the bar 15, back of the saddle of the attachment. The sleeve or coupling 30 is provided at its front end with an inwardly-projecting annular flange 31, engaging in front of an annular flange or collar 32 on the rear end of the bar 15. By screwing the sleeve or coupling 30 rearward the rear end of the bar 15 is jammed tight against the boss or thimble 29, thus forming a stout union between the two frames, the coupling 30 being provided with wrench-engaging surfaces whereby with the aid of a wrench it may be turned tightly to place. Unions of the same nature are made between the bars 27 at their rear ends and bosses or thimbles 33, extending forward from and formed integrally with the crank-hanger of the machine-frame, the sleeves or couplings being indicated at 34. A perfectly rigid connection is thus established between the frame 1 and the frame of the attachment, and the connection can be made in a very short space of time.

In order to enable the hind rider to have control of the steering-wheel, a long steering-stem 35 is provided, which extends downward from the rear handle-bar 36, through the head-tube 2, and through the hollow stem 23 and brace 25, terminating just below the crown of the fork 26, as shown in Fig. 4. Upon the lower end of the stem 35 is a small sprocket-wheel 37, around which runs a short section of chain 38. To the opposite ends of the chain 38 are attached small rods or wires 39, which straddle the seat-post tube 17 and reach-bar 16 and connect at their front ends to the crown or blades of the front fork 22. Thus as the handle-bar 36 is turned the sprocket 37 is correspondingly turned, and through the chain 38 and connections 39 the steering-wheel is also turned, thus giving the hind rider control of the steering apparatus. Annular cushions 40, of rubber or other suitable material, are arranged above and beneath the head-tube 2 to form a tight and anti-rattling connection between the two frames.

When it is desired to convert the tandem into a single machine, the stem 35, which is made in sections, is removed and the connections 39 disengaged from the front fork. The couplings 30 and 34 are now unscrewed, after which the stem 23 may be removed from the head-tube 2 upon the chain 19 being detached. The front wheel with its fork is now removed from the head-tube of the attachment and inserted in the head-tube of the frame 1, after which the handle-bar 41 is applied and the rider has a single machine ready for use. The arrangement described will, it is apparent, be a very desirable one, as it enables a rider of limited means to own both a single machine and a tandem. If desired, the bar 15 of the attachment may be omitted, so as to form a drop-frame and provide what is known as a "combination-tandem" for two riders, one a lady and the other a gentleman. The mechanism described is therefore susceptible of various changes in the form, proportion, and minor details of construction, which may accordingly be resorted to without departing from the spirit or sacrificing any of the advantages of this invention.

Having thus described the invention, what is claimed as new is—

1. In a convertible bicycle, the combination of an ordinary diamond bicycle-frame having a single integral boss projection on its head-tube, and one or more similar projections on its crank-hanger, and an extension tandem-forming frame having a stem entering the head-tube of the primary frame, an upper horizontal bar lineally alined with the corresponding bar of the primary frame and detachably coupled at its rear end to said boss projection on the head-tube, and horizontal braces extended rearward from its crank-hanger and having detachable coupling connection with the boss projections on the crank-hanger of the primary frame, substantially as set forth.

2. A safety-bicycle diamond frame having a threaded boss on its head-tube, in combination with a half-diamond extension-frame having a stem adapted to enter said head-tube and also having a threaded sleeved coupling for engaging the aforesaid boss, substantially as described.

In testimony that I claim the foregoing as my own I have hereto affixed my signature in the presence of two witnesses.

LOUIS G. H. KINSMAN.

Witnesses:
GEORGE H. KINSMAN,
MILTON J. PATIENCE.